US008805450B2

(12) United States Patent
Wen et al.

(10) Patent No.: US 8,805,450 B2
(45) Date of Patent: Aug. 12, 2014

(54) INTELLIGENT CONTACT MANAGEMENT

(75) Inventors: Yandong Wen, Beijing (CN); Liang Chen, Beijing (CN); David Vronay, Beijing (CN); Rebecca Sundling, Beijing (CN)

(73) Assignee: Microsoft Corp., Redmond, WA (US)

(*) Notice: Subject to any disclaimer, the term of this patent is extended or adjusted under 35 U.S.C. 154(b) by 657 days.

(21) Appl. No.: 12/204,819

(22) Filed: Sep. 5, 2008

(65) Prior Publication Data

US 2010/0062753 A1 Mar. 11, 2010

(51) Int. Cl.
| | | |
|---|---|---|
| H04M 3/42 | (2006.01) | |
| H04M 3/00 | (2006.01) | |
| H04M 1/00 | (2006.01) | |
| G06F 3/033 | (2013.01) | |
| G09G 5/08 | (2006.01) | |
| G09G 5/00 | (2006.01) | |
| H04L 12/26 | (2006.01) | |
| H04L 12/66 | (2006.01) | |
| H04M 15/00 | (2006.01) | |
| H04M 1/56 | (2006.01) | |
| H04M 15/06 | (2006.01) | |
| G06F 7/00 | (2006.01) | |
| G06F 3/00 | (2006.01) | |
| G06F 3/14 | (2006.01) | |

(52) U.S. Cl.
USPC ........ 455/566; 455/414.1; 455/418; 345/157; 345/581; 370/252; 370/352; 379/127.01; 379/142.01; 379/355.02; 707/705; 707/792; 715/739; 715/764

(58) Field of Classification Search
CPC ....... G06F 3/038; G06F 3/044; G06F 3/0338; G06F 3/0481; G06F 3/0448; G06F 3/0483; G06F 17/30067; G06F 17/30286; G06F 17/30595; G06F 17/30864; G06F 17/30867; G06F 17/30884; G06F 17/30873; G06T 11/00; G06T 11/60; G06T 11/206; H04L 12/5695; H04L 12/2697; H04L 29/06326; H04L 29/06027; H04M 1/57; H04M 1/573; H04M 3/533; H04M 3/42059; H04M 3/42042; H04M 1/2745; H04M 1/274516
USPC ........ 455/405, 412.2, 414.1, 418, 456.1, 466, 455/512, 558, 566; 345/157, 440, 581, 619; 379/88.19, 127.01, 142.01, 355.02; 707/705, 792; 715/735
See application file for complete search history.

(56) References Cited

U.S. PATENT DOCUMENTS 5,903,634 A * 5/1999 Wakabayashi et al. .. 379/127.01
6,529,724 B1 * 3/2003 Khazaka et al. ............. 455/405

(Continued)

OTHER PUBLICATIONS

Whittaker, et al,"Managing Long Term Communications: Conversation and Contact Management",Proceedings of the 35th Hawaii International Conference on System Sciences—2002, pp. 10.

(Continued)

*Primary Examiner* — Bobbak Safaipour
*Assistant Examiner* — Paul P Tran
(74) *Attorney, Agent, or Firm* — Dan Choi; Carole Boelitz; Micky Minhas

(57) ABSTRACT

An intelligent contact management technique that automatically manages contacts on a communication device such as a mobile phone is described. The intelligent management technique can automatically determine and display a user's favorite contacts on a display of a mobile device. The technique can also intelligently group contacts based on their contact frequency. It can provide a contact-oriented event notification that notifies a user when a contact event has occurred. The contact-oriented event notification can be associated with a visual representation of an associated contact.

19 Claims, 8 Drawing Sheets

(56) References Cited

U.S. PATENT DOCUMENTS

| | | | |
|---|---|---|---|
| 6,909,910 B2 | 6/2005 | Pappalardo et al. | |
| 7,003,327 B1 | 2/2006 | Payne et al. | |
| 7,139,555 B2 | 11/2006 | Apfel | |
| 7,212,111 B2* | 5/2007 | Tupler et | 340/539.18 |
| 7,219,303 B2 | 5/2007 | Fish | |
| 7,280,652 B2 | 10/2007 | Bocking et al. | |
| 7,375,730 B2* | 5/2008 | Tagliabue et al. | 345/581 |
| 7,738,912 B1* | 6/2010 | Hawkins et al. | 455/550.1 |
| 2004/0066920 A1 | 4/2004 | Vandermeijden | |
| 2005/0054381 A1* | 3/2005 | Lee et al. | 455/557 |
| 2006/0035632 A1 | 2/2006 | Sorvari et al. | |
| 2006/0206446 A1 | 9/2006 | Cowell et al. | |
| 2006/0209690 A1* | 9/2006 | Brooke | 370/230 |
| 2007/0035513 A1 | 2/2007 | Sherrard et al. | |
| 2008/0153503 A1* | 6/2008 | Birla et al. | 455/450 |
| 2008/0192732 A1* | 8/2008 | Riley et al. | 370/352 |
| 2008/0208812 A1* | 8/2008 | Quoc et al. | 707/3 |
| 2008/0285729 A1* | 11/2008 | Glasgow et al. | 379/88.13 |
| 2009/0170480 A1* | 7/2009 | Lee | 455/414.1 |
| 2009/0234874 A1* | 9/2009 | Sylvain | 707/102 |

OTHER PUBLICATIONS

Oulasvirta, et al,"ContextContacts: Re-Designing SmartPhone's Contact Book to Support Mobile Awareness and Collaboration", MobileHCI'05, Sep. 19-22, 2005, Salzburg, Austria. Copyright 2005 ACM, pp. 8.

\* cited by examiner

INTELLIGENT CONTACT MANAGEMENT

BACKGROUND

Mobile phone ownership has increased dramatically in the last ten years. Ten years ago there was approximately one mobile phone for every five people in the United States. Since then, mobile phone proliferation has exploded, with many markets nearing saturation worldwide. Advances in cell phone technology have included improvements in processing speed, storage capacity, connectivity, battery life and screen resolution. Many modern cell phones are now more computationally advanced than the desktop computers of ten years ago. Despite the fact that mobile phones have become a ubiquitous accessory, most mobile User Interfaces (UIs) are not optimized for communication purposes. For instance, most communications happen between a mobile phone owner and a few of his or her favorite contacts, but these favorite contacts are handled in the same manner as other contacts in most of mobile UIs. Typically, in these UIs, users have to go to a phone book (phone number listing by contact on the mobile phone) to find a contact to communicate with regardless of whether the contact is a favorite contact or normal contact.

Although there are a few UIs that attempt to promote favorite contacts out from other contacts, they are not particularly effective. For example, some methods place favorite contacts on a home screen (start up screen) of a mobile phone or at the top of a phone book on a mobile phone to make them easier to access. This does help users, however, there is still room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The intelligent contact management technique described herein intelligently manages the contacts on a user's mobile communication device, such as, for example, a mobile phone. One embodiment of the intelligent management technique manages contacts on a home screen of a mobile device, intelligently groups contacts, and provides contact-oriented events notification.

More particularly, in one embodiment of the intelligent contact management technique, favorite or preferred contacts are automatically determined according to a user's contact or communication transaction history with a group of contacts. Favorite or preferred contacts can then be displayed on the startup or home screen of a mobile phone or other communication device and be dynamically updated based on how often there is contact with them. For example, more frequently contacted contacts can be displayed larger than ones that are contacted less frequently.

In another embodiment of the intelligent contact management technique contacts on a communication device (e.g., a mobile phone) are automatically grouped based on contacts' attributes or tags. These tags can be determined from information associated with a contact from a given application (e.g., an email application) or be entered by a user.

In still another embodiment of the intelligent contact management technique, a contact-oriented notification system is provided. This aspect of the intelligent contact management technique associates communications from a given contact, and optionally mode of communication, with a visual representation of the contact on a mobile communication device's display.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the intelligent contact management technique, reference is made to the accompanying drawings, which form a part thereof, and which is shown by way of illustration examples by which the intelligent contact management technique may be practiced. It is to be understood that other embodiments may be utilized and structural changes may be made without departing from the scope of the claimed subject matter.

1.0 Intelligent Contact Management Technique

The intelligent contact management technique described herein intelligently manages contacts on users' communication devices. For example, one embodiment of the technique manages contacts on a start up or home screen of a mobile communication device (e.g., a mobile phone), automatically groups contacts and performs contact-oriented events notification.

The following sections provide a description of an exemplary contact management environment, an exemplary architecture, and exemplary processes for employing the intelligent contact management technique.

1.1 Contact Management Environment

Figure 1:
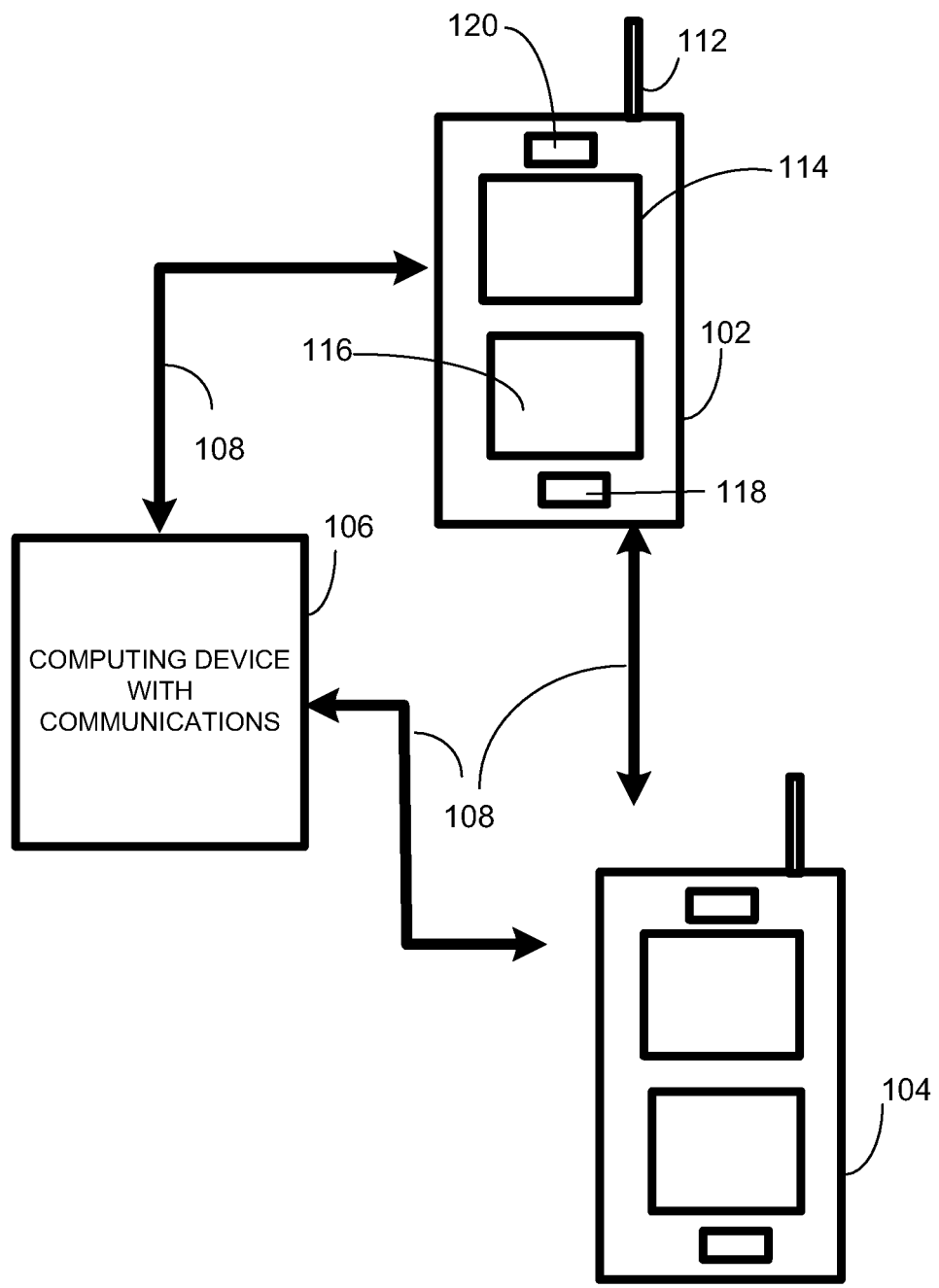
FIG. 1 provides an overview of one possible environment in which contact management for mobile devices is typically carried out.

FIG. 1 provides an overview of an exemplary environment in which the intelligent contact management technique may be carried out. Typically, a user uses a mobile communication device 102, such as, for example, a mobile phone, to make contact with other communication devices 104, 106 over a cellular network, wireless network or other communications link 108. For example, communications between such devices can be over a cellular network, a blue tooth network, a LAN, and the Internet, to name a few.

A typical mobile communication device 102, such as a mobile phone, has a display 114, a data entry pad or touch screen 116 for entering data, a microphone 118, a speaker 120, and an antenna 112. Such a mobile communication device can be used to receive and make phone calls; transfer pictures and files; access the Internet or other Local Area Network (LAN) (e.g., inside a business); and to manage one or more calendars or schedules. Depending on the model, other functions that a user can perform using a mobile communication device are storing contact information, making to-do lists, sending or receiving email and text messages, watching television and integrating with other devices such as, for example, music players and global positioning system (GPS) receivers.

1.2 Exemplary Architecture

Figure 2:
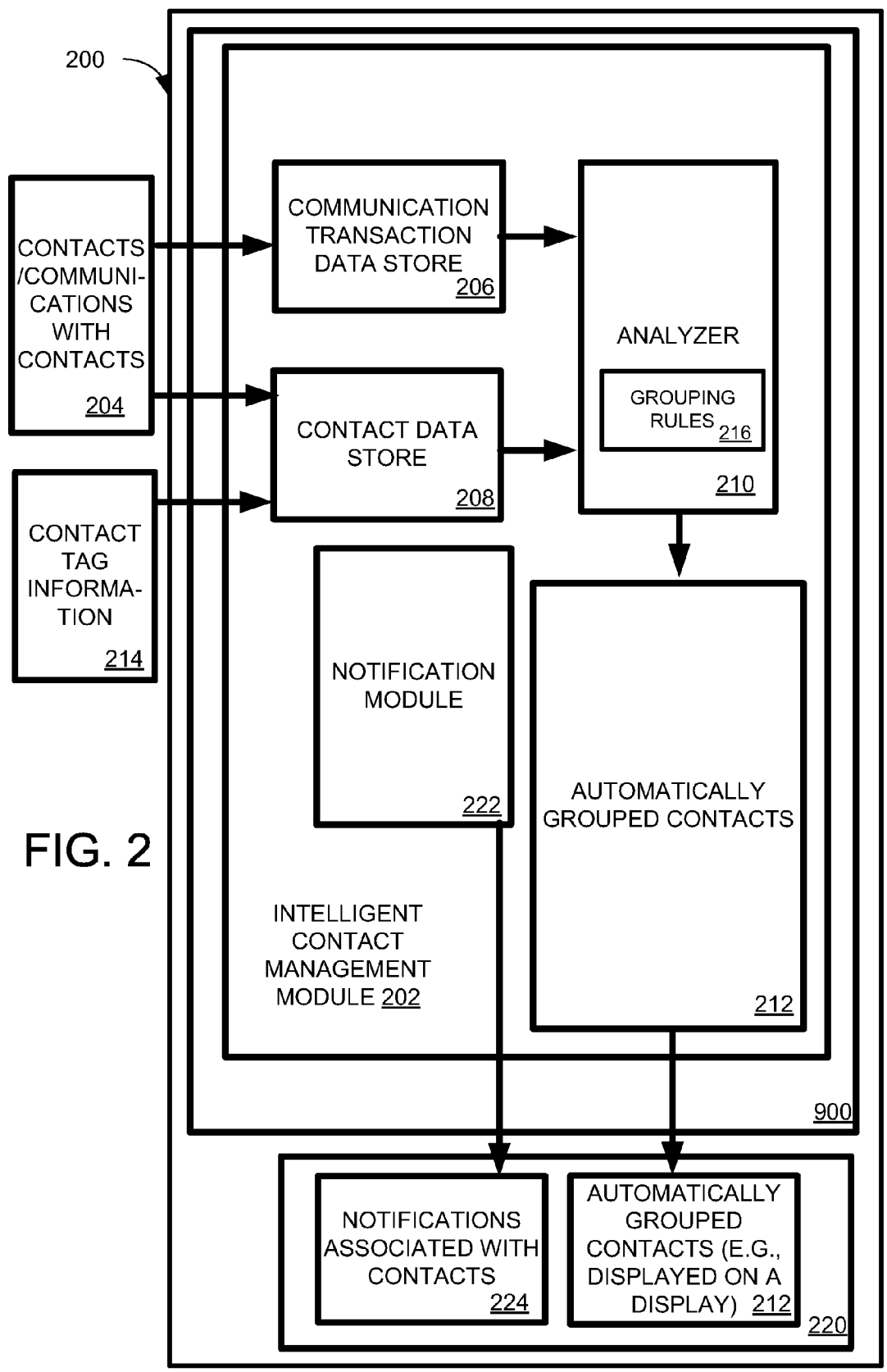
FIG. 2 is a diagram depicting one exemplary architecture in which one embodiment of the intelligent contact management technique can be employed.

One exemplary architecture, shown in FIG. 2, in which the intelligent contact management technique can be practiced, employs an intelligent contact management module 202 that resides on a mobile communication device 200 that includes a computing device 900 (such as discussed later with respect to FIG. 9). In this exemplary architecture the above-discussed mobile communication device/phone capabilities can be performed.

Communications with contacts and contacts themselves 204 are stored in a communication transaction data store 206 and a contact data store 208, respectively. In one embodiment of the technique the contact data store 208 includes each contact's name, phone number or numbers and email addresses, among other data. Furthermore, in one embodiment the communication transaction data store 206 includes contact name, contact number or other identifier for reaching the contact, length of communication, and time of communication, among other data. An analysis module 210 analyzes the communication transaction data store 206 and the contact data store 208 and determines a user's favorite contacts and other contact groupings 212 from this information. Alternately, a user can specify tags 214 associated with contacts in the contact data store 208, or these tags can be automatically extracted from other applications resident on the mobile communications device, in order for the analysis module to automatically determine contact groupings 212 based on the tags. In one embodiment this is done by employing a preprogrammed set of grouping rules 216 that define groups based on tags. The grouped contacts are then output, such as, for example, by displaying them to a user on a display 220.

The intelligent contact management module 202 can also include a notification module 222 that creates notifications 224 from communications from a contact. It can associate such notifications 224 with a graphic representation of the contact and, if desired, the mode of communication, on the mobile communication device's display 220. The communication transaction data store 206 can therefore store the different communications modes in this embodiment to enable this capability.

1.3 Exemplary Processes for Employing the Intelligent Contact Management Technique In this section some exemplary processes for employing the intelligent contact management technique are described. Details regarding these processes follow in the next section.

Figure 3:
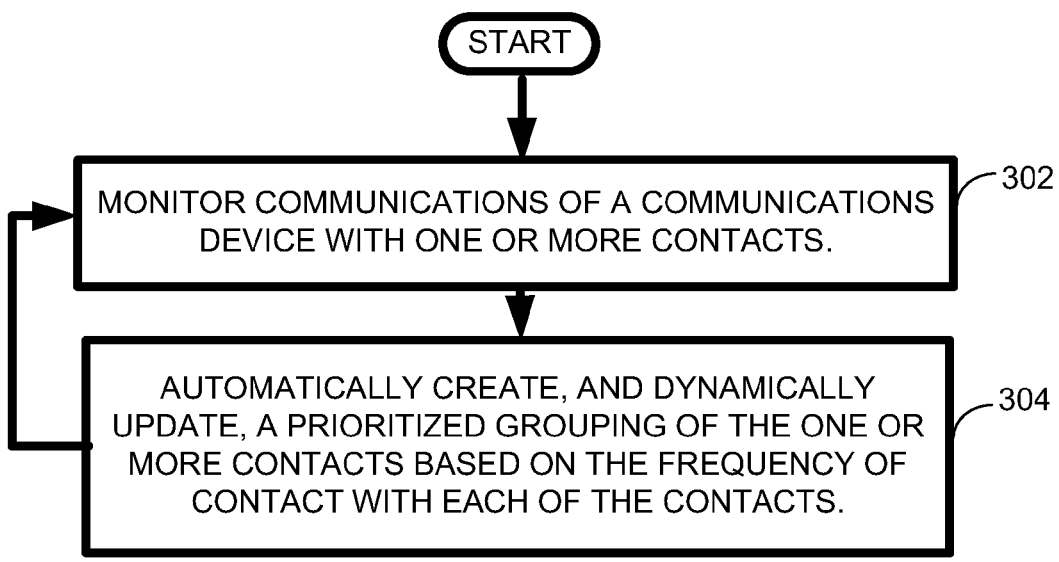
FIG. 3 is a flow diagram depicting an exemplary process employed in one embodiment of the intelligent contact management technique in which contacts are managed and displayed based on contact history.

A very general exemplary process for employing the intelligent contact management technique is shown in FIG. 3. As shown in FIG. 3, a communication device's (e.g., mobile phone's) communications with one or more contacts is monitored (block 302). A prioritized grouping of the contacts with which the communication device has the most contact is created and is dynamically updated based on the frequency of the device's communications with each contact (block 304).

Figure 4:
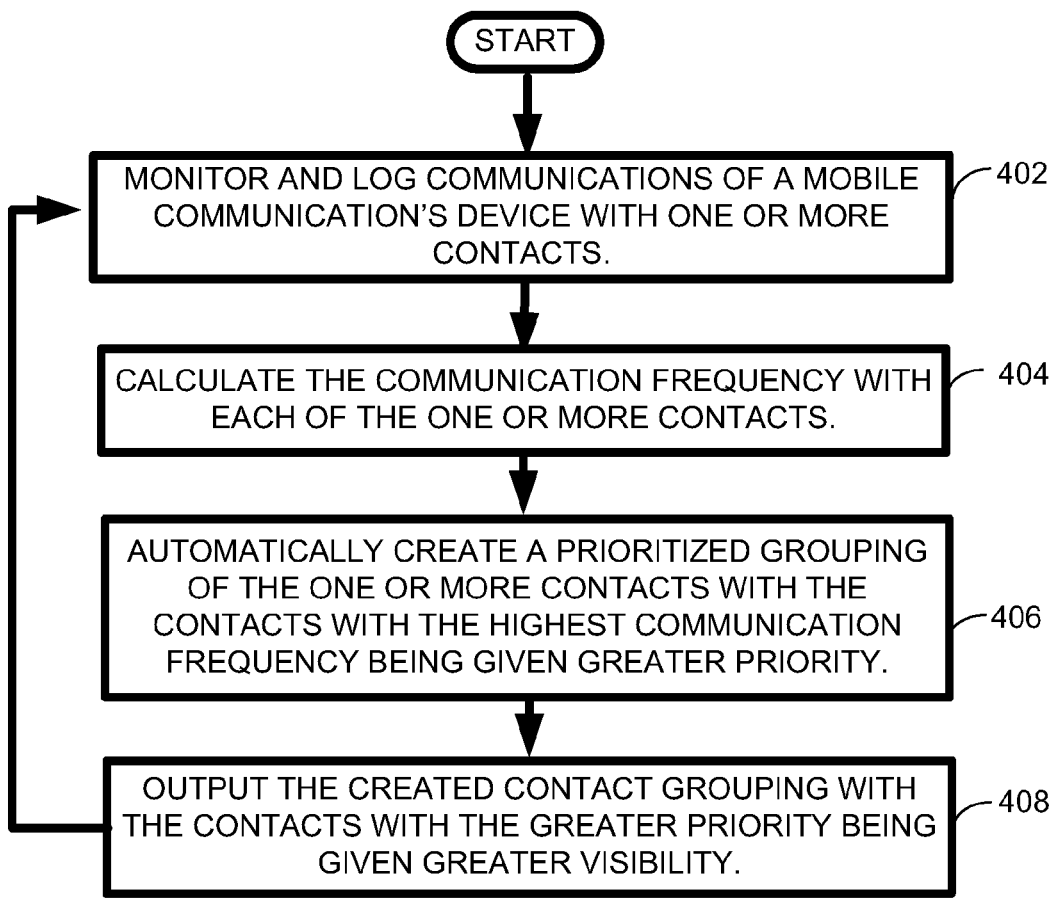
FIG. 4 is a flow diagram depicting an exemplary process employed in one embodiment of the intelligent contact management technique which operates by using the transaction history between contacts to group contacts.

More specifically, another exemplary process for employing the intelligent contact management technique is shown in FIG. 4. As shown block 402, the communications of a mobile communication device with one or more contacts is monitored and logged. The communication frequency with each of the one or more contacts is then calculated (block 404). A prioritized grouping (e.g., a prioritized contact list) is then created with the contacts with the highest communication frequency being given greater priority, as shown in block 406. These results can be output to a user with the contacts with a higher priority being given greater visibility (block 408). For example, only the contacts that are frequently contacted by the mobile communication device might be displayed on the mobile communication device, increasing in size for contacts with a higher priority, while less frequently contacted contacts may merely be retained in the phone book of the mobile communication device.

Figure 5:
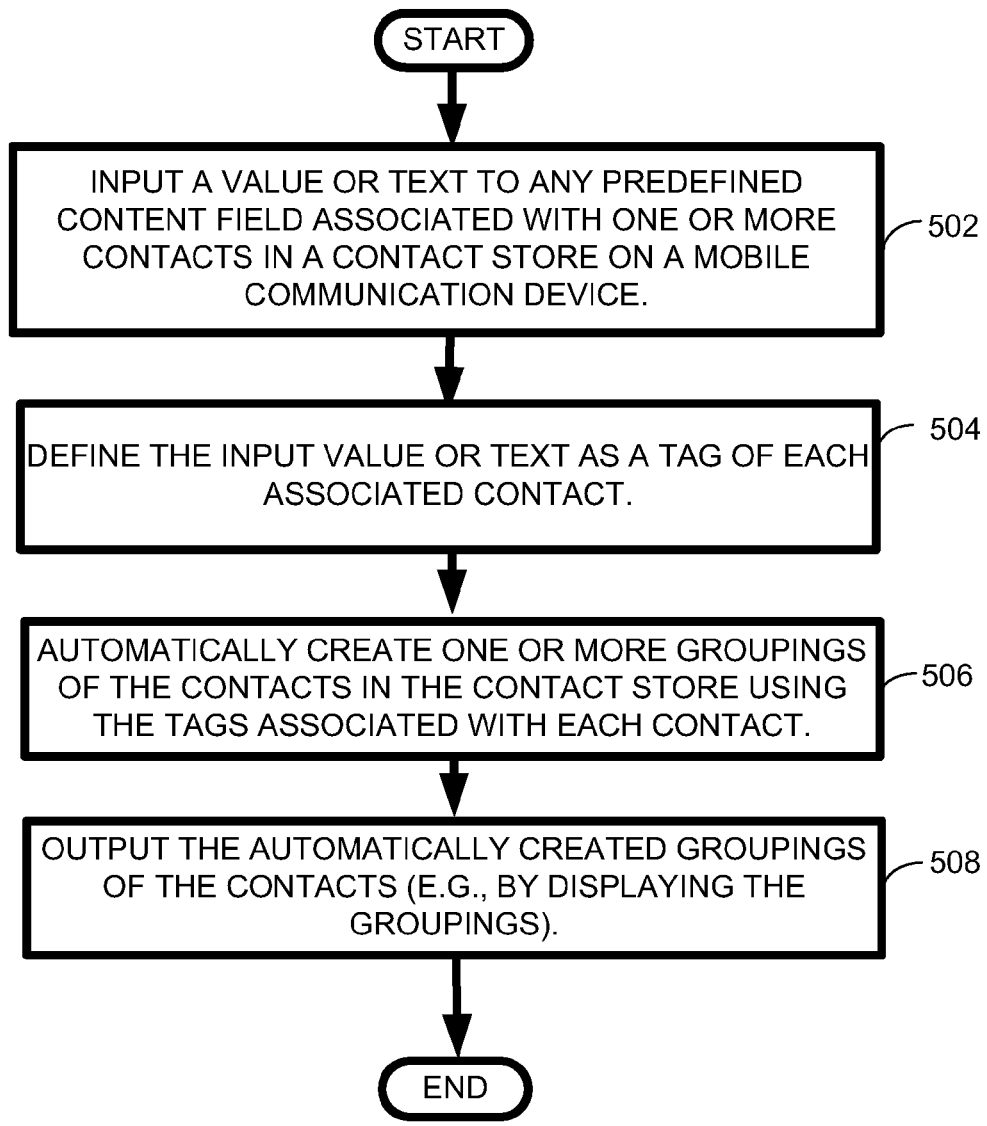
FIG. 5 is a flow diagram depicting an exemplary process employed in one embodiment of the intelligent contact management technique which operates by using tags associated with contacts to automatically group contacts.

Another exemplary process for employing the intelligent contact management technique is shown in FIG. 5. In this embodiment, a value or text is entered into any predefined content field associated with a contact in a contact store on a mobile communication device (block 502). As discussed previously with respect to FIG. 2, the value or text can be user-entered or extracted from another application or data store resident on the mobile communication device. This value or text automatically becomes a tag of the associated contact (block 504). Based on the tags, groupings of contacts are automatically created (block 506). These groupings are then displayed or otherwise provided to a user (block 508).

It should be noted that many alternative embodiments to the discussed embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure.

1.4 Exemplary Embodiments and Details

The following paragraphs provide details and alternate embodiments of the exemplary architecture and processes presented above.

1.4.1 Managing Contacts

As discussed previously, with respect to FIGS. 2, 3 and 4, in one embodiment of the intelligent contact management technique, instead of users setting their favorite contacts, a mobile communication device employing the intelligent contact management technique automatically selects a user's favorite contacts based on their communication transaction history. In other words, a mobile communication device (e.g., a mobile phone) employing the intelligent contact management technique maintains a favorite contacts list for users. It monitors and logs the communications of the mobile communications device, calculates the communication frequency, and constantly updates the favorite contact list with the most often used contacts.

Figure 6:
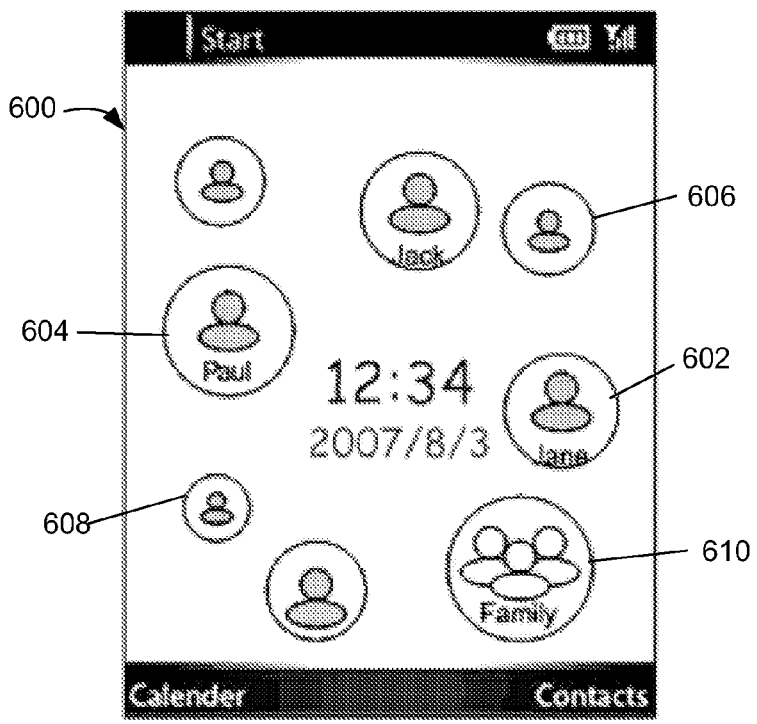
FIG. 6 is an exemplary UI of one embodiment of the intelligent contact management technique showing dynamically sized contacts displayed on a home screen of a mobile communication device such as a mobile phone. The size of each contact is based on the frequency of communication with that contact.

The more often a contact is contacted, the easier it should be to be accessed on the display of a mobile communication device. Therefore, in one embodiment, on touch display mobile phone devices, the intelligent contact management technique dynamically adjusts the sizes of favorite contact images or graphical representations on a home screen or start up screen based on communication frequency. An example of this UI 600 is shown in FIG. 6. As shown in FIG. 6, the more often a contact is communicated with, the bigger a graphical representation or image of the contact on the display becomes, so that it is more noticeable to a user and easier to touch. For example, referring to FIG. 6, a graphical representation of the contact "Jane" 602 is displayed smaller than the graphical representation of the contact "Paul" 604. This is because the communication frequency with Jane is less than that with Paul. Other contacts 606, 608, with which the mobile communication device's user communicates even less frequently, are shown even smaller than the representations of Jane 602 and Paul 604. Another feature of this embodiment of the intelligent management technique is that contacts can be grouped and a graphical representation can be created for the whole group. This is the case for the "family" representation 610 of a group of contacts. Selecting the family graphical representation 610 provides a display of individual contacts within that group.

In another embodiment of the intelligent contact management technique, for keypad operation devices, the communication history determines the positions of favorite contacts and displays them on the home screen of the mobile device: more important contacts can therefore be navigated to with fewer key actions.

Figure 7:
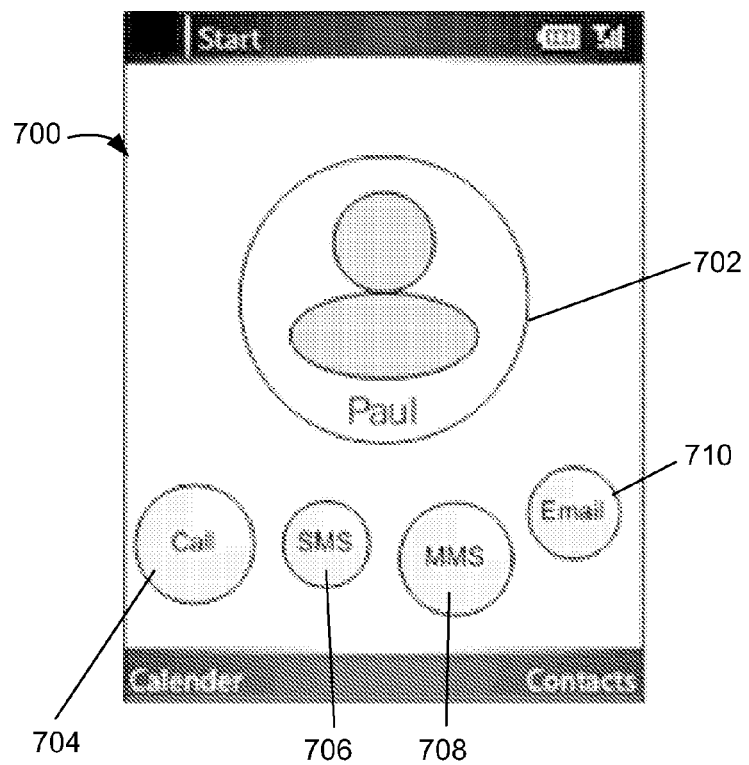
FIG. 7 is an exemplary UI of one embodiment of the intelligent contact management technique showing dynamically sized communication channels displayed on a home screen of a mobile communication device such as a mobile phone.

A similar principle as discussed above can be applied to the communication mode selection UI for each contact. In one embodiment of the intelligent contact management technique, after a user selects a contact, he or she selects a channel to communicate with that contact. For example, an exemplary UI 700 displaying a contact 702 and associated communication channels or modes 704, 706, 708, 710 is shown in FIG. 7. In this embodiment, the communication mode can be via a call 704, Short Message Service (SMS) 706, Bluetooth 708, Infrared 710, and so on. In one embodiment of the technique, based on the communication history with this contact 702, the mobile communication device can perform some re-ordering, re-sizing, or auto-suggesting to make sure that the most used communication channel or mode is the easiest to choose.

Letting a mobile communication device choose the favorite contacts may not be appreciated by all users, especially those that like to be in control. Therefore, one embodiment of the intelligent contact management technique lets users set their favorite contacts. In this embodiment, the mobile communication device still monitors the communication transaction history, and makes suggestions for including contacts in the favorite contacts based on contact frequency statistics. For example, if a non-favorite contact is used more often than a favorite contact, the mobile device asks the user whether to replace it; or if a favorite contact has not been contacted for a long time, the mobile device may remind the user to contact him or her.

1.4.2 Grouping Contacts

Contact grouping is not used in most communications devices because users have to manually compose all groups and add contacts to the composed groups one by one. This tedious process dissuades most users from creating groups on their mobile communication devices such as mobile phones.

As previously discussed with respect to the exemplary process shown in FIG. 5, automatic grouping can be employed in one embodiment of the intelligent contact management technique in order to create a grouping feature that is readily usable to users. To implement this capability, in one embodiment, contacts can be associated with 'tags'. If a user enters a value to any predefined content field of a contact, the value automatically becomes a tag of the contact. A user can also assign free text tags to a contact. Based on the tags, groups are automatically created for a user. Automatic grouping, for example, can be as follows. Contacts having the same tag may automatically become one group. Some groups can be built by analyzing the tags associated with the contacts. For example, by analyzing the tags groups like "Birthday in July"; "Internet or email buddies" (if email address falls in specific domains); "Friends in China" (if mobile device number starts with "+86"); "Colleagues" (if the organization is same as the owner); and so on, can be created. Contacts can also be grouped based on communication history, such as, for example: "People I call most"; "People who text me most"; "People I have not contacted for 3 months"; and "People that shared files with me".

These automatic groups can be shown in a mobile device's phone book. They can be presented on a mobile communication device's home screen or start up screen as well, together with favorite contacts.

1.4.3 Contact-Oriented Notifications

Contact-oriented notifications were discussed previously with respect to FIG. 2. Since favorite contacts or groups can be shown on a home screen or start up screen of a mobile communications device, one embodiment of the intelligent management technique visually associates notifications related to the contact with the contact on the display of the device. This not only makes it easier for users to handle these notifications, but also gives them the feeling that they are directly communicating with these contacts. More specifically, this aspect of the intelligent contact management technique creates a notification from an incoming communication and associates this communication with a visual or graphical representation of the contact on the display of a communication device.

Figure 8:
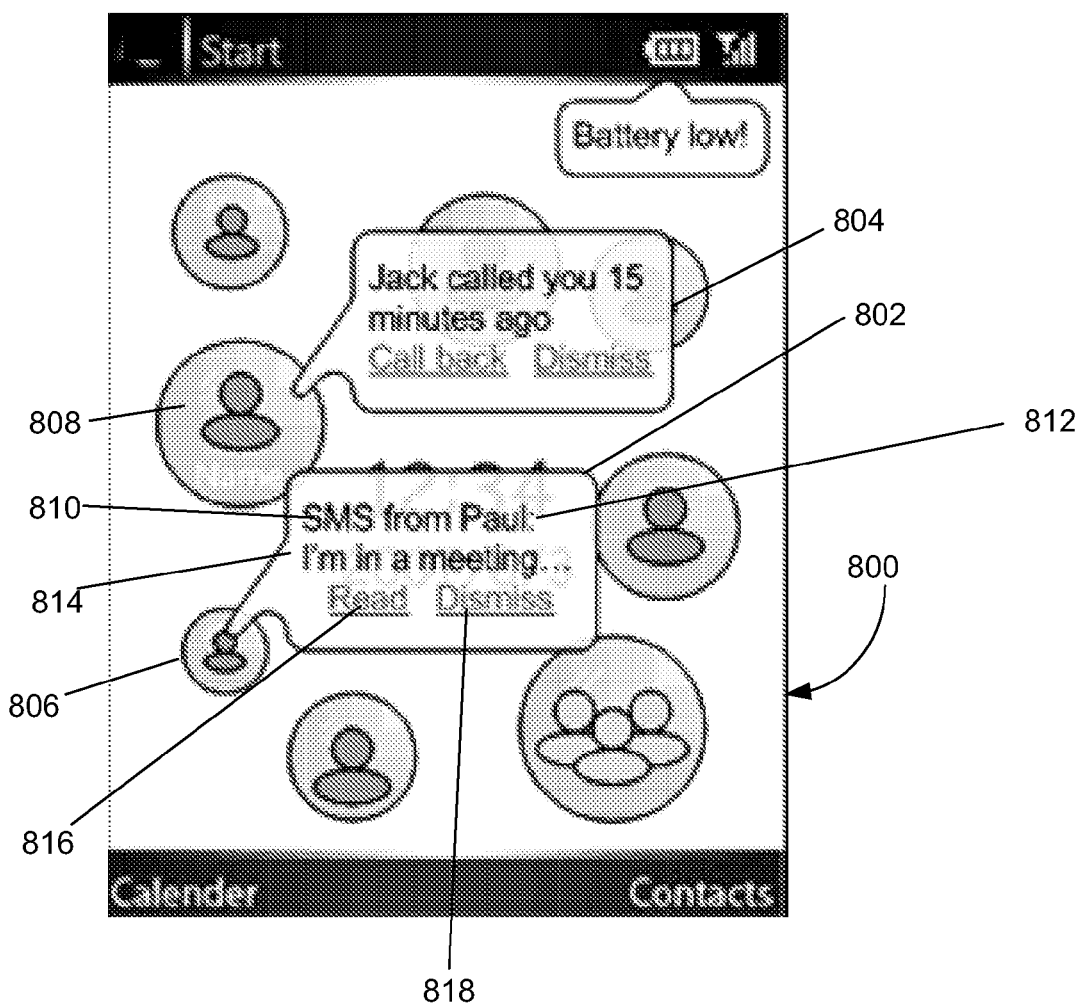
FIG. 8 is an exemplary UI of one embodiment of the intelligent contact management technique showing contact-oriented notifications employed in one embodiment of a mobile communication device employing the intelligent contact management technique.

An example of a UI 800 that employs contact-oriented notification is shown in FIG. 8. In this embodiment, notifications 802, 804 are associated with a contact 806, 808. For example, in this embodiment, notification 802 provides the communications mode 810, contact's name 812 and message 814. The communication device's user can also readily act on the notification 802 by selecting a "read" option 816 or a "dismiss" 818 option.

2.0 The Computing Environment

The intelligent contact management technique is designed to operate in a computing environment. The following description is intended to provide a brief, general description of a suitable computing environment in which the intelligent contact management technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular mobile devices, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 9:
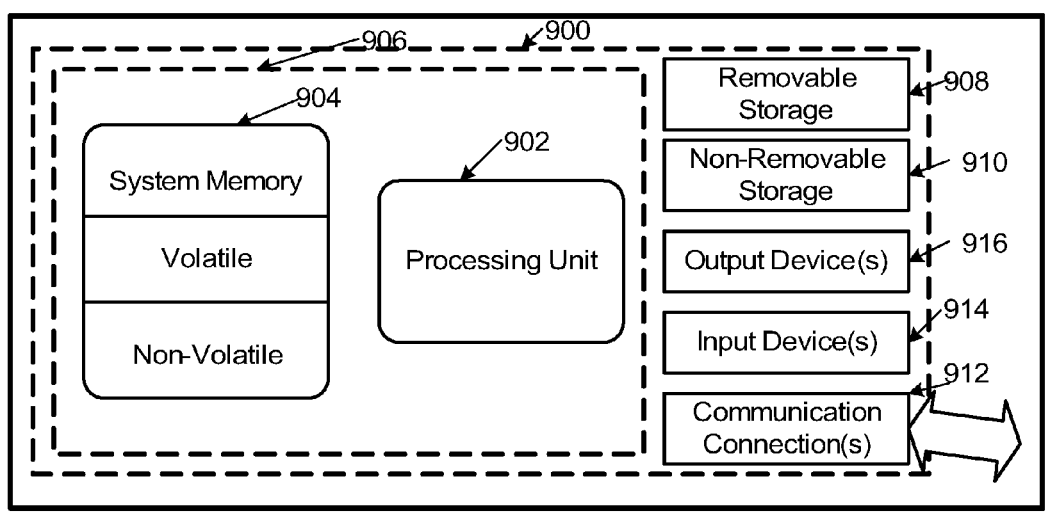
FIG. 9 is a schematic of an exemplary computing device in which the intelligent contact management technique can be practiced.

FIG. 9 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 9, an exemplary system for implementing the intelligent contact management technique includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, and so on) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 has a display 918, and contains communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may have various input device(s) 914 such as a keyboard, mouse, pen, camera, touch input device, and so on. Output device(s) 916 such as speakers, a printer, and so on may also be included. All of these devices are well known in the art and need not be discussed at length here.

The intelligent contact management technique may be described in the general context of computer-executable instructions, such as program modules, being executed by a computing device. Generally, program modules include routines, programs, objects, components, data structures, and so on, that perform particular tasks or implement particular abstract data types. The intelligent contact management technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, although the intelligent contact management technique is most useful on a mobile communication device due to the limited amount of display space on such devices, the various embodiments and capabilities discussed herein can equally be applicable to a communication device that is not mobile. The specific features and acts described above are disclosed as example forms of implementing the claims.

Wherefore, what is claimed is:

1. A computer-implemented process for automatically managing contacts for a communication device, comprising:
   monitoring and logging the communications and the mode of communication of the communication device with one or more contacts;
   calculating the communication frequency and the communication mode frequency with each of the one or more contacts using a log of the communications and a log of the mode of communications;
   automatically creating a prioritized contact grouping comprising contacts with a higher communication frequency being grouped in a grouping of favorite contacts and given greater priority for being more prominently displayed than lower priority contacts, and an associated prioritized communication mode grouping for each contact wherein a communication mode with a higher communication mode frequency is given higher priority;
   automatically creating a notification to alert the user which displays an image of the prioritized contact when an incoming communication has been received from the prioritized contact along with an associated prioritized communication mode from the prioritized communication mode grouping based on the communication mode frequency; and
   monitoring the automatically created grouping of favorite contacts and including a contact or deleting a contact from the favorite contacts based on contact frequency statistics.

2. The computer-implemented process of claim 1, further comprising updating the created prioritized contact grouping when the calculated communication frequency with one or more contacts changes.

3. The computer-implemented process of claim 1, further comprising more prominently displaying the contacts with a greater priority on a display of the communication device.

4. The computer-implemented process of claim 3, further comprising displaying contacts with a greater priority larger on a touch screen display of the communication device.

5. The computer-implemented process of claim 1, further comprising grouping one or more of the contacts by communication frequency into one or more groups.

6. The computer-implemented process of claim 1, further comprising more prominently displaying communication modes with a higher priority.

7. The computer-implemented process of claim 6, further comprising displaying communication modes with a higher priority larger on a touch screen display of the communication device.

8. The computer-implemented process of claim 1 wherein a user can override the prioritized contact grouping and wherein the user is prompted to change the priority of a contact in the contact grouping.

9. The computer-implemented process of claim 1, further comprising prompting the user to call a contact in the favorite contacts based on contact frequency statistics.

10. A computer-implemented process for managing the contacts on a mobile communication device, comprising:
   entering a value or text into a predefined content field associated with one or more contacts in a contact store on the mobile communication device;
   defining the input value or text as a tag associated with each contact of the one or more contacts in the contact store;
   automatically creating one or more groupings of the one or more contacts in the contact store based on one or more tags wherein a user can override a contact grouping;
   automatically creating a prioritized contact grouping based on contact frequency statistics comprising contacts with a higher communication frequency being grouped in a grouping of favorite contacts and given greater priority for being more prominently displayed than lower priority contacts, and an associated prioritized communication mode grouping for each contact wherein a communication mode with a higher communication mode frequency is given higher priority; and
   monitoring the automatically created prioritized contact grouping and prompting the user to manually change the prioritized contact grouping based on contact frequency statistics to create a new prioritized contact grouping.

11. The computer-implemented process of claim 10, further comprising automatically grouping contacts having the same tag as a same group.

12. The computer-implemented process of claim 10, further comprising:
   analyzing the tags for common characteristics; and
   automatically grouping contacts with tags having the same characteristics in a same group.

13. The computer-implemented process of claim 10, further comprising displaying the all of the contacts of a grouping as a single graphical representation of the contacts of the grouping on the display of the mobile communication device.

14. The computer-implemented process of claim 13, further comprising displaying individual contacts within a grouping on the display of the mobile communication device when the single graphical representation of the grouping is selected.

15. The computer-implemented process of claim 10, further comprising a user entering the value or text into any pre-defined content field.

16. The computer-implemented process of claim 10, further comprising extracting the value or text from another application resident on the mobile communication device.

17. A system for managing contacts on a mobile communication device, comprising:
   a general purpose computing device;
   a computer program comprising program modules executable by the general purpose computing device, wherein the computing device is directed by the program modules of the computer program to,
   receive a communication from a contact at a mobile communication device;
   associate the communication from the contact with the same contact in a contact data store;
   create a contact-oriented notification associated with the communication from the contact comprising the text of the communication, the name of the contact, and a priority mode of communication associated with the contact based on communication mode frequency wherein a given communication mode with a higher communication mode frequency is given higher priority; and
   automatically display the contact-oriented notification alerting a user that a communication from the contact has been received with a graphical representation of the contact associated with the contact-oriented notification on a display of the mobile communication device.

18. The system of claim 17 wherein the contact-oriented notification further provides a means to respond to the communication.

19. The system of claim 17 wherein the contact-oriented notification corresponds to a graphical representation of a contact that varies in size with the frequency of communication with the contact.

* * * * *